United States Patent [19]

Kidd

[11] 4,041,682
[45] Aug. 16, 1977

[54] MOUNTING ARRANGEMENT FOR ROTARY MOWER CHUTE EXTENSION

[75] Inventor: Earl H. Kidd, Galesburg, Ill.

[73] Assignee: Outboard Marine Corporation, Waukegan, Ill.

[21] Appl. No.: 632,256

[22] Filed: Nov. 17, 1975

[51] Int. Cl.² .......................................... A01D 75/20
[52] U.S. Cl. ............................................... 56/320.2
[58] Field of Search ............... 56/202, 320.2, 17.4, 56/255

[56] References Cited

U.S. PATENT DOCUMENTS

| | | | |
|---|---|---|---|
| 3,423,918 | 1/1969 | Siwek | 56/202 |
| 3,503,194 | 3/1970 | Ritums | 56/320.2 UX |
| 3,721,078 | 3/1973 | Haffner | 56/202 |
| 3,760,572 | 9/1973 | Marion et al. | 56/320.2 |
| 3,872,656 | 3/1975 | Dahl | 56/202 |

Primary Examiner—Russell R. Kinsey
Attorney, Agent, or Firm—Michael, Best & Friedrich

[57] ABSTRACT

Disclosed herein is a rotary lawn mower including a cutting blade, a cutter blade housing having a depending wall enclosing the cutter blade and a laterally extending discharge chute, a discharge chute extension, and a hinge connection uniting the chute extension to the discharge chute for movement of the chute extension from a raised, generally inoperative storage position to a lowered, guard position and for thereafter preventing upward movement of the chute extension from the guard position.

6 Claims, 5 Drawing Figures

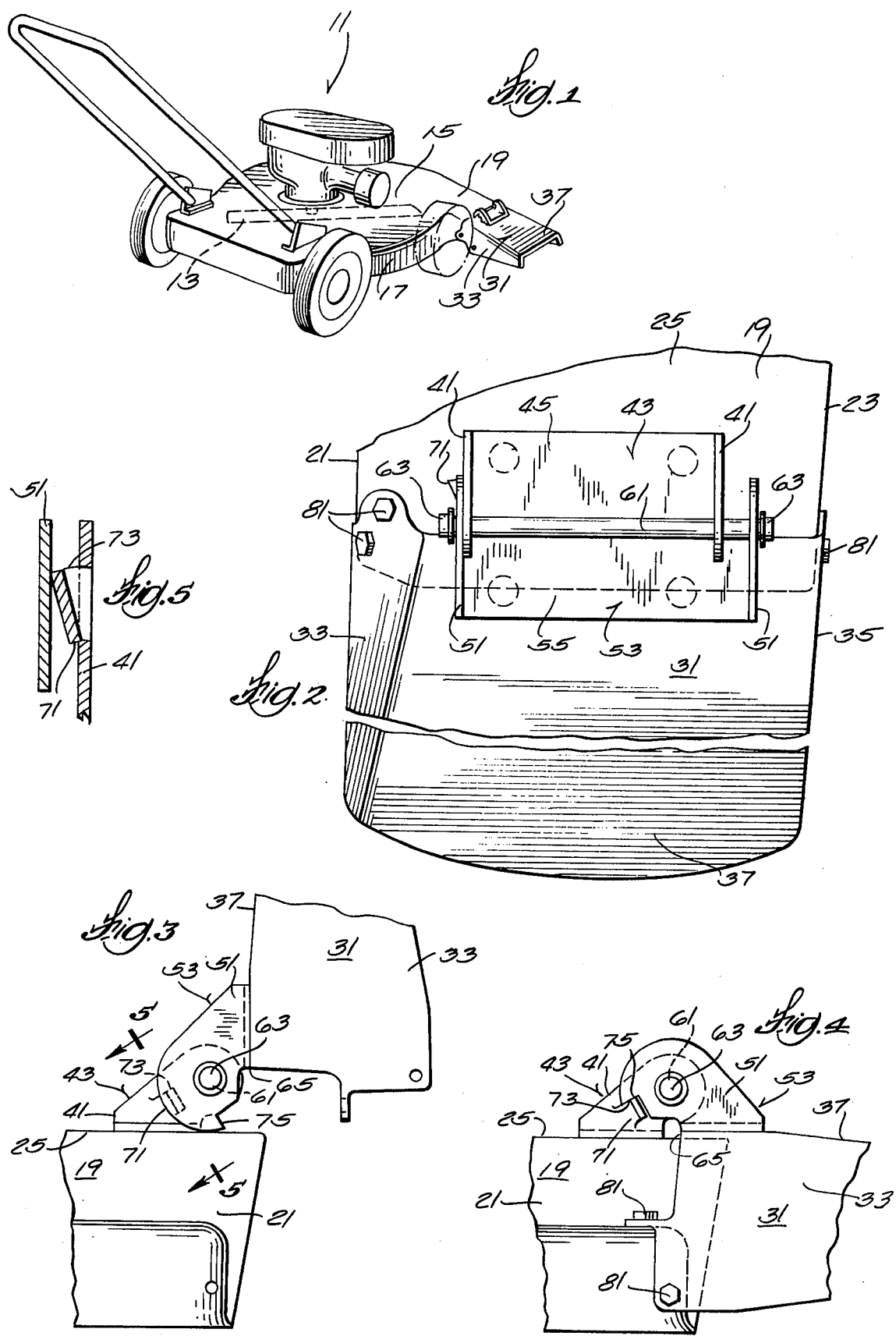

MOUNTING ARRANGEMENT FOR ROTARY MOWER CHUTE EXTENSION

BACKGROUND OF THE INVENTION

The invention relates generally to lawn mowers and, more particularly, to rotary lawn mowers including a cutter blade rotatable in a cutter blade housing having a laterally extending discharge chute. Still more particularly, the invention relates to rotary mower cutter blade housings having discharge chute extensions for downwardly deflecting the exiting grass clippings and debris. The invention is equally applicable to riding rotary lawn mowers and to push-type rotary lawn mowers.

Use of such a chute extension fixed to the end of a discharge chute of a cutter blade housing has been known. In the past, such chute extensions were attached by nut and bolt or other connections and extended fixedly from the cutter blade housing, thereby disadvantageously increasing the lateral dimension of the mower and requiring greater storage space and larger shipping cartons. Furthermore, the prior connections disadvantageously permitted easy removal of the extension from the chute or displacement of the extension from a guarding position. At least partial avoidance of these disadvantages is a goal of the invention disclosed herein.

SUMMARY OF THE INVENTION

The invention provides a rotary lawn mower including a cutting blade, a cutter blade housing having a depending wall enclosing the cutter blade and a laterally extending discharge chute, a discharge chute extension, and means connecting the chute extension to the discharge chute for movement of the chute extension from a raised, generally inoperative storage position to a lowered, guard position and for thereafter preventing upward movement of the chute extension from the guard position.

In one embodiment, the connecting means comprises a pair of ears extending from the chute is generally parallel, laterally spaced relation to each other, a pair of tabs extending from the extension in generally parallel, laterally spaced relation to each other at a distance greater than the lateral spacing of said ears, and located in overlapping, laterally outward relation to the ears, a hinge pin extending through the ears and the tabs, a laterally outwardly extending projection on one of the ears, which projection has a transverse surface, and a surface located on the tab adjacent to said one ear, when the chute extension is in the guard position, for engagement with the transverse surface to prevent movement of the extension from the guard position.

In one embodiment, the discharge chute is generally of inverted U-shape including a pair of laterally spaced side walls and a top wall interconnecting the side walls, the ears are part of a U-shaped bracket fixed to the top wall of the discharge chute, the chute extension is generally of inverted U-shape including a pair of laterally spaced side walls and a top wall interconnecting the side walls, the tabs are part of a U-shaped bracket fixed to the top wall of the chute extension, and means are provided on the hinge pin for preventing movement axially thereof relative to the tabs.

One of the principal features of the invention is provision of a rotary lawn mower with a discharge chute extension which is assembled to the cutter blade housing in raised or upright location by a connecting arrangement which permits displacement of the chute extension from the raised position to a lowered guard position and which thereafter prevents upward movement of the chute extension from the lowered guard position i.e., which thereafter non-releasably fixedly holds the chute extension in the guard position.

Other features and advantages of the embodiments of the invention will become known by reference to the following general description, appended claims, and attached drawings.

THE DRAWINGS

FIG. 1 is a perspective view of a rotary lawn mower incorporating various of the features of the invention.

FIG. 2 is an enlarged top view fragmentarily illustrating the blade housing and chute extension of the lawn mower shown in FIG. 1.

FIG. 3 is a fragmentary side elevation view showing the chute extension of the lawn mower shown in FIG. 1 in raised position.

FIG. 4 is a view similar to FIG. 3 showing the chute extension in the lowered guard position.

FIG. 5 is an enlarged, fragmentary sectional view taken along line 5—5 of FIG. 3.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a fragmentarily illustrated rotary lawn mower 11 including a rotary cutter blade 13 and a blade housing 15 enclosing the cutter blade 13. The blade housing 15, as is conventional, includes a depending wall 17 which laterally encloses the cutter blade 13 and an inverted, generally U-shaped discharge chute 19 having spaced side walls 21 and 23 and a top wall 25 connecting the side walls. The discharge chute 19 can extend generally laterally and tangentially from the perimeter of the path of the cutter blade 13.

In order to increase the length of the discharge chute 19, while at the same time, avoiding excessive increase in the lateral dimension of the mower prior to mowing usage, i.e., during initial storage and shipment, there is provided a chute extension 31 which is mounted on the discharge chute 19. Initially, the chute extension 31 is mounted on the discharge chute 19 in a generally upright, raised or storage position as shown in FIG. 3 and is movable to a laterally outwardly extending, lower operating or guard position as shown in FIGS. 1, 2 and 4.

More specifically, the chute extension 31 is also of inverted, generally U-shape, including a pair of laterally spaced side walls 33 and 35 which are connected by a top wall 37 and which are spaced from each other at a distance greater than the lateral spacing of the discharge chute side walls 21 and 23. When the chute extension 31 is located in the guard position, the chute extension 31 extends smoothly from the discharge chute 19 and the top wall 37 gradually extends downwardly toward the ground.

The mounting arrangement is such that, when the chute extension 31 is in the raised position, the side walls 33 and 35 of the chute extension laterally outwardly overlie at least some part of the side walls 21 and 23 of the discharge chute 19. In addition, when the chute extension 31 is in the guard position, the margins of the side and top walls 33, 35 and 37 of the chute extension 31 overlie the margins of the side and top walls 21, 23 and 25 of the discharge chute 19.

While the mounting arrangement affords assembly at the factory of the chute extension 31 to the discharge chute 19 with the chute extension in the upright position, as well as initial storage and shipment of the mower with the chute extension 31 in the upright position, and movement of the chute extension 31 from the upper or storage position to the laterally extending lowered guard position, the mounting arrangement also prevents subsequent upward movement of the chute extension 31 from the lowered guard position.

The mounting arrangement or means connecting the chute extension 31 to the discharge chute 19 includes a pair of laterally spaced ears 41 extending upwardly from the top wall 25 of the discharge chute 19 in generally parallel relation to each other. In the illustrated construction, the ears 41 are part of a U-shaped bracket 43 including a web 45 which interconnects the ears 41 and which is suitably fixed to the top wall 25 of the discharge chute 19 by any suitable means, such as by welding or riveting.

The mounting arrangement also includes a pair of tabs 51 which extend upwardly in parallel relation to each other from the top wall 37 of the chute extension 31 and which are laterally spaced from each other at a distance somewhat greater than the spacing between the ears 41. In the illustrated construction, the tabs 51 are part of a U-shaped bracket 53 including a web 55 which interconnects the tabs 51 and which is fixed to the top wall 37 of the chute extension by any suitable means, such as by welding or riveting.

As shown, the tabs 51 extend in partial overlying and laterally outwardly relation to the ears 41 and are connected thereto by a hinge pin 61 which extends through the ears 41 and tabs 51 and which is prevented from moving axially through any material distance by end locks or caps 63. If desired, retaining rings could be used. In any event, the end locks 63 or retaining rings must be removed by hand tools in order to permit axial movement of the hinge pin 61 to afford disassembly of the chute extension 31 from the discharge chute 19.

The brackets 43 and 53 are fixed to the discharge chute 19 and to the chute extension 31 so that the ear 41 and tab 51 shown to the left in FIG. 2 are in closely adjacent relation or tight engagement with each other and so that the margin of the side wall 35 of the chute extension 31 is in closely adjacent relation or in tight engagement with the margin of the side wall 21 of the discharge chute 19. In addition, the brackets 43 and 53 are so shaped and the brackets 43 and 53 are respectively fixed to the discharge chute 19 and to the chute extension 31 so that the right edge of the hinge pin 61 is located (See FIG. 4) directly above the inner edge 65 of the top wall 37 of the chute extension 31.

When initially assembled, the chute extension 31 is located in its raised or upright position to facilitate storage and shipment. However, prior to initial mowing use, the chute extension is moved from its upright position to its lowered guard position. This movement brings into play components which permit movement of the chute extension 31 from the raised position to the lowered guard position, but which interlock to prevent reverse movement of the chute extension 31 upwardly from the lowered guard position.

More specifically, such components comprise a projection 71 on the outside surface of one of the ears 41, which projection 71 inclines outwardly so as to cam the adjacent tab 51 outwardly during movement of the chute extension 51 from the raised storage position to the lowered guard position. The projection 71 also includes a transverse surface 73 which engages an edge 75 on the adjacent tab 51 to prevent upward movement of the chute extension 31 after the extension is located in the lowered guard position.

Thus, in operation, the adjacent tab 51 rides along the projection 71 during movement of the chute extension 31 from the raised position to the lowered guard position. Some force may be required to displace the chute extension 31 from the raised storage position to the lowered guard position because lateral movement of the chute extension 31 in the direction of the axis of the hinge pin 61 is generally prevented by the laterally outward overlying relation of the margins of the side walls 33 and 35 of the chute extension 31 to the side walls 21 and 23 of the discharge chute 19. Thus, some minor distortion of the adjacent ear 41 and tab 51 may take place during movement from the raised or storage position to the lowered guard position. However, when the chute extension 31 is located in the lowered guard position, the overlying relation of the margins of the side walls of the discharge chute 19 and chute extension 31 insure that the surface 73 will remain in position for engagement by the edge 75 to prevent upward movement of the chute extension 31 from the lowered guard position.

If desired, additional means can also be provided to substantially prevent upward movement of the chute extension 31 from the lowered guard or normal operation position. Such means can comprise one or more nut and bolt connections 81 through the overlying margins of the top and side walls of the discharge chute 19 and chute extension 31.

Thus, the disclosed construction provides an arrangement for mounting a chute extension on a discharge chute in such manner that the hinge provided thereby functions only once and so as to prevent upward movement of the chute extension from the lowered guard position in the absence of disassembly of the mounting arrangement, which disassembly requires the use of hand tools.

Various of the features of the invention are set forth in the following claims:

I claim:

1. A rotary lawn mower including a cutter blade, a cutter blade housing having a depending wall enclosing said cutter blade and a laterally extending, inverted U-shaped discharge chute having a pair of laterally spaced side walls, an inverted U-shaped discharge chute extension having a pair of laterally spaced side walls, and means connecting said chute extension to said discharge chute for movement of said chute extension from a raised, generally inoperative storage position extending upwardly from said discharge chute to a lowered guard position extending outwardly from said discharge chute with said side walls of said extension in laterally outwardly partially overlying relation to said sides of said chute, and for thereafter non-releasably fixedly holding said chute extension in the guard position.

2. A rotary mower in accordance with claim 1 wherein said connecting means comprises a pair of ears extending from said chute in generally parallel, laterally spaced relation to each other, a pair of tabs extending from said extension in generally parallel, laterally spaced relation to each other at a distance greater than the lateral spacing of said ears and located in overlapping, laterally outward relation to said ears, a hinge pin extending through said ears and said tabs, a laterally outwardly extending projection on one of said ears, said projection having a transverse surface, and a surface located on said tab adjacent to said one ear when said chute extension is in the guard position, for engagement with said transverse surface to prevent movement of said extension from the guard position.

3. A rotary lawn mower in accordance with claim 2 wherein said discharge chute includes a top wall interconnecting said side walls and wherein said ears are part of a U-shaped bracket fixed to said top wall of said discharge chute.

4. A rotary lawn mower in accordance with claim 2 wherein said chute extension includes a top wall interconnecting said side walls and wherein said tabs are part of a U-shaped bracket fixed to said top wall of said chute extension.

5. A rotary lawn mower in accordance with claim 2 wherein said discharge chute includes a top wall interconnecting said side walls and wherein said ears are part of a U-shaped bracket fixed to said top wall of sid discharge chute, wherein said chute extension includes a top wall interconnecting said side walls and wherein said tabs are part of a U-shaped bracket fixed to said top wall of said chute extension, and further including means on said hinge pin preventing movement axially thereof relative to said tabs.

6. A rotary mower in accordance with claim 1 wherein said connecting means comprises an ear extending upwardly from said chute, a tab extending upwardly from said extension in overlapping, lateral relation to said ear, a laterally outwardly extending projection on said ear, said projection having a transverse surface, and a surface on said tab located, when said chute extension is in the guard position, for engagement with said transverse surface to prevent movement of said extension from the guard position.

* * * * *